(12) United States Patent
Kawamura et al.

(10) Patent No.: US 10,029,513 B2
(45) Date of Patent: Jul. 24, 2018

(54) WHEEL BEARING APPARATUS

(71) Applicant: NTN Corporation, Osaka-shi (JP)

(72) Inventors: Hiroshi Kawamura, Iwata (JP); Shunsuke Morita, Iwata (JP)

(73) Assignee: NTN Corporation, Osaka-shi (JP)

( * ) Notice: Subject to any disclaimer, the term of this patent is extended or adjusted under 35 U.S.C. 154(b) by 0 days.

(21) Appl. No.: 15/482,733

(22) Filed: Apr. 8, 2017

(65) Prior Publication Data
US 2017/0210165 A1 Jul. 27, 2017

Related U.S. Application Data

(63) Continuation of application No. PCT/JP2015/078737, filed on Oct. 9, 2015.

(30) Foreign Application Priority Data

Oct. 10, 2014 (JP) ................................ 2014-208888

(51) Int. Cl.
*B60B 27/00* (2006.01)
*B60B 27/06* (2006.01)
(Continued)

(52) U.S. Cl.
CPC .......... *B60B 27/0005* (2013.01); *B60B 27/02* (2013.01); *F16C 19/186* (2013.01);
(Continued)

(58) Field of Classification Search
CPC ...... F16C 19/08; F16C 19/186; F16C 19/522; F16C 27/066; F16C 35/06; F16C 2326/02;
(Continued)

(56) References Cited

U.S. PATENT DOCUMENTS 4,642,866 A * 2/1987 Murtaugh ............. B25B 27/062
29/259
6,406,186 B1 * 6/2002 Torii ....................... B60B 27/00
384/448
(Continued)

FOREIGN PATENT DOCUMENTS

CN 201143957 Y * 11/2008 ............... B62D 7/18
CN 203822799 U * 9/2014 ............... F16B 35/00
(Continued)

OTHER PUBLICATIONS

Supplementary European Search Report from corresponding EP Application No. 15849780.0, dated May 11, 2018.

*Primary Examiner* — Marcus Charles
(74) *Attorney, Agent, or Firm* — Harness, Dickey & Pierce, P.L.C.

(57) ABSTRACT

A wheel bearing apparatus has an outer member with a body mounting flange to be mounted on a knuckle that forms part of a suspension apparatus. An inner member includes a wheel hub and at least one inner ring. The inner ring is press fit onto a cylindrical portion of the wheel hub. Double row rolling elements are contained between double row inner raceway surfaces and double row outer raceway surfaces, respectively, of the inner member and the outer member. The outer member is adapted to be fastened to the knuckle through securing bolts. A vibration damping member is interposed between opposite surfaces of the body mounting flange of the outer member and the knuckle.

6 Claims, 6 Drawing Sheets

(51) Int. Cl.
  *F16F 15/08* (2006.01)
  *B60B 27/02* (2006.01)
  *F16F 15/06* (2006.01)
  *F16C 19/18* (2006.01)
  *F16C 35/06* (2006.01)
  *F16C 27/06* (2006.01)

(52) U.S. Cl.
  CPC ............ *F16C 27/066* (2013.01); *F16C 35/06* (2013.01); *F16F 15/06* (2013.01); *F16F 15/08* (2013.01); *B60B 27/0094* (2013.01); *B60B 27/065* (2013.01); *B60B 2380/12* (2013.01); *B60B 2380/73* (2013.01); *B60B 2900/131* (2013.01); *F16C 2326/02* (2013.01)

(58) Field of Classification Search
  CPC . F16C 15/08; F16F 15/02; F16F 15/06; F16F 15/10; F16B 35/00; B60B 27/0005; B60B 27/0052; B60B 27/065; B60B 2380/12; B60B 2380/73; B60B 2900/131
  USPC ........ 384/445, 456, 490, 504, 537, 544, 562
  See application file for complete search history.

(56) References Cited

U.S. PATENT DOCUMENTS 7,452,133 B2 * 11/2008 Ohtsuki ................. B60B 27/00
                                                              324/174
8,021,052 B2 * 9/2011 Ozaki ..................... B60B 27/00
                                                              324/207.13
2009/0148091 A1    6/2009  Kametaka et al.

FOREIGN PATENT DOCUMENTS

| | | | |
|---|---|---|---|
| DE | 19602407 C1 | 8/1997 | |
| JP | 2001-246903 | 9/2001 | |
| JP | 2003278778 A | 10/2003 | |
| JP | 2004-155261 | 6/2004 | |
| JP | 2006284402 A * | 10/2006 | ............. F16C 33/78 |
| JP | 2006-306382 | 11/2006 | |
| JP | 2007038820 A * | 2/2007 | ............. F16C 19/52 |
| JP | 2007-153226 | 6/2007 | |
| JP | 2009-150470 | 7/2009 | |
| JP | 2009257596 A * | 11/2009 | ............. F16C 27/06 |
| JP | 2010000907 A | 1/2010 | |
| JP | 2012047247 A * | 3/2012 | ............. F16D 65/00 |
| JP | 2012-081822 | 4/2012 | |
| JP | 2013-086514 | 5/2013 | |
| JP | 2014-037196 | 2/2014 | |
| JP | 2014040195 A * | 3/2014 | ............. F16C 19/38 |
| JP | 5648373 B2 * | 1/2015 | ............. B60B 27/04 |
| JP | 2015-113037 | 6/2015 | |
| WO | WO-9913232 A1 | 3/1999 | |
| WO | WO-2004099747 A1 * | 11/2004 | ............. B60B 27/00 |
| WO | WO-2007089642 A1 | 8/2007 | |

* cited by examiner

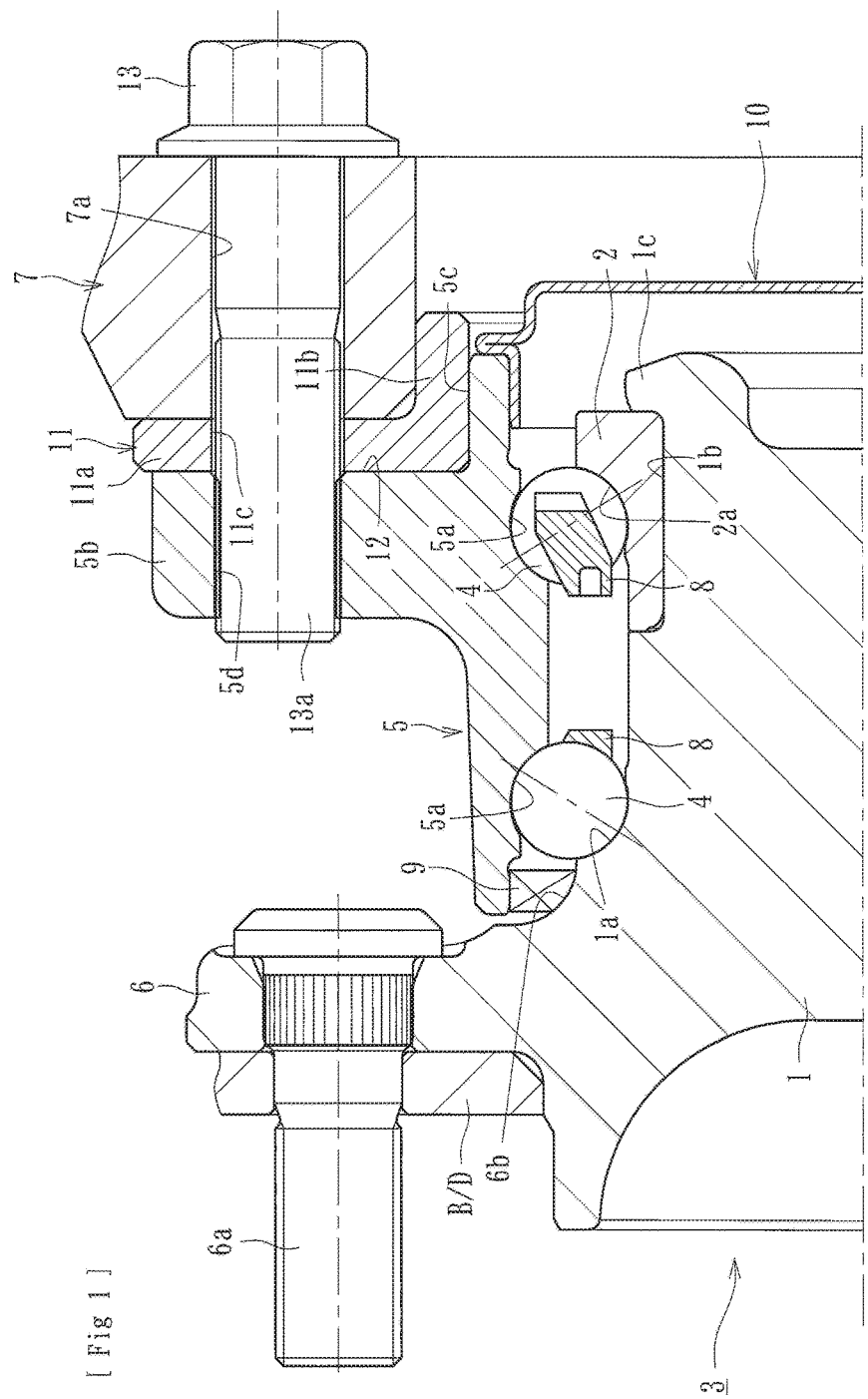
[Fig 1]

[Fig 2]
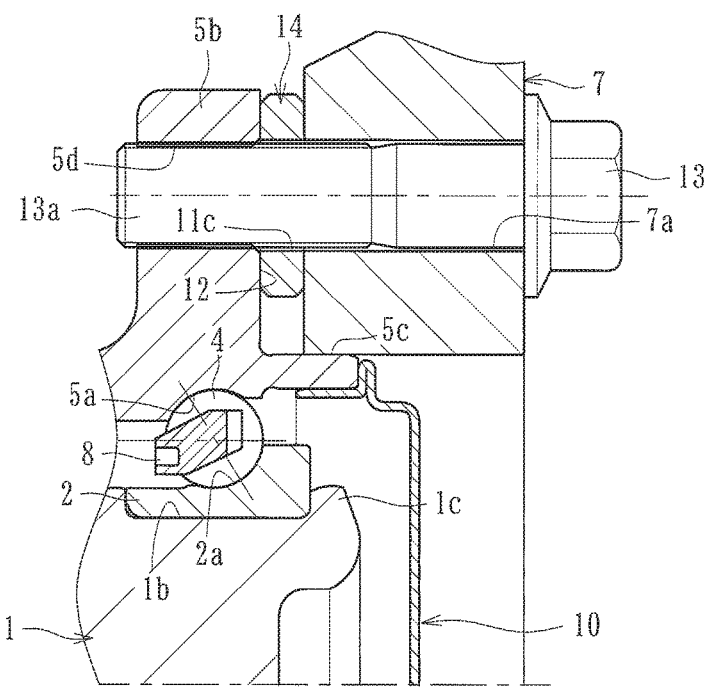
[Fig 3]
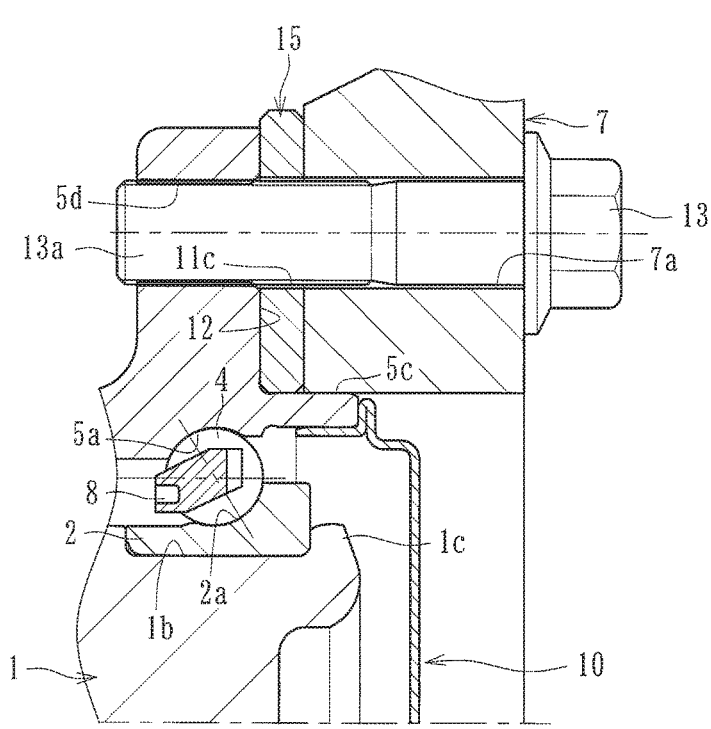

[Fig 4]
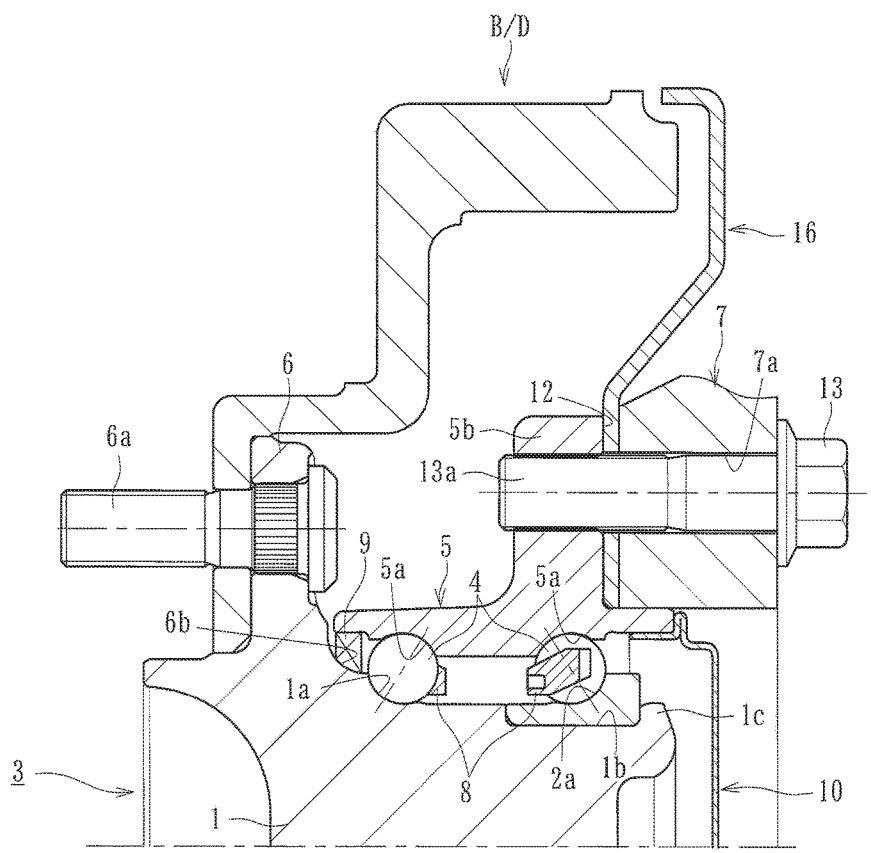

[Fig 5]
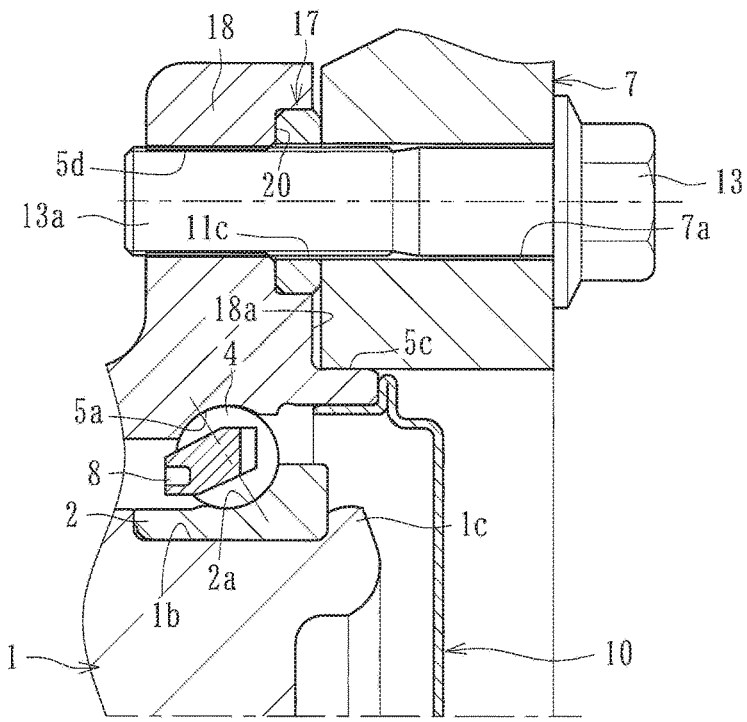
[Fig 6]
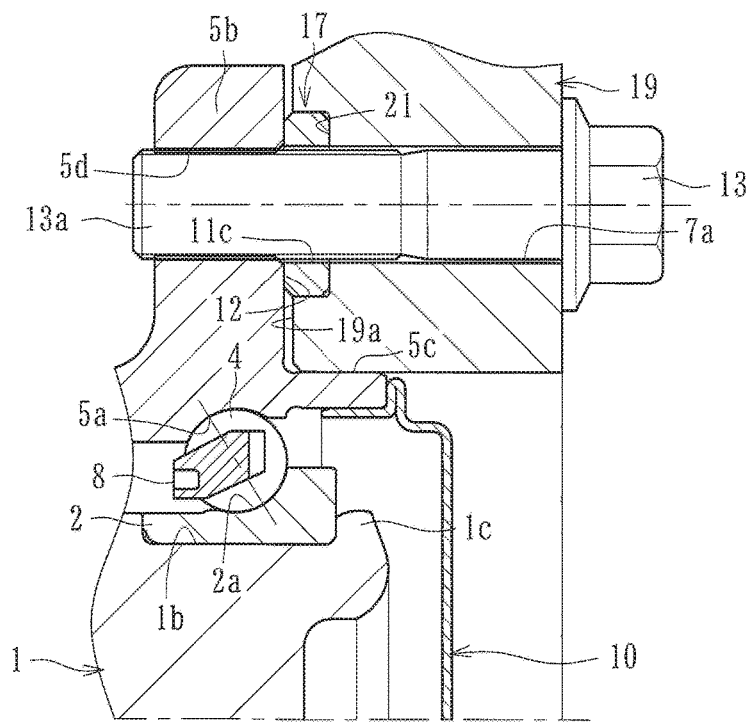

[Fig 7]
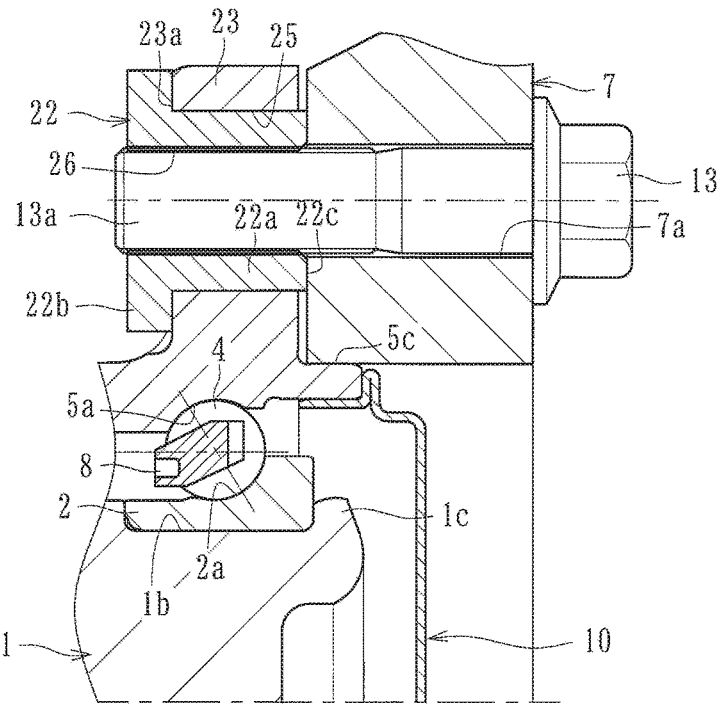
[Fig 8]
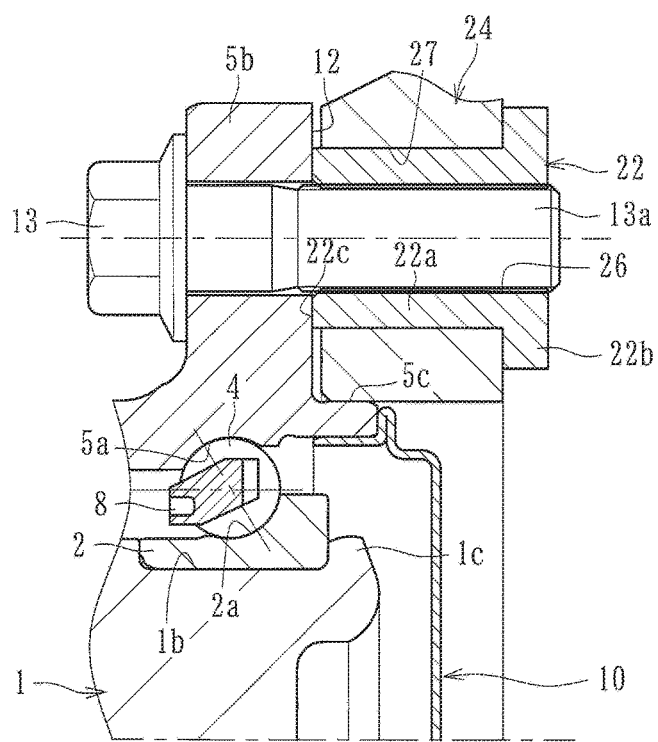

[Fig 9]
Prior Art
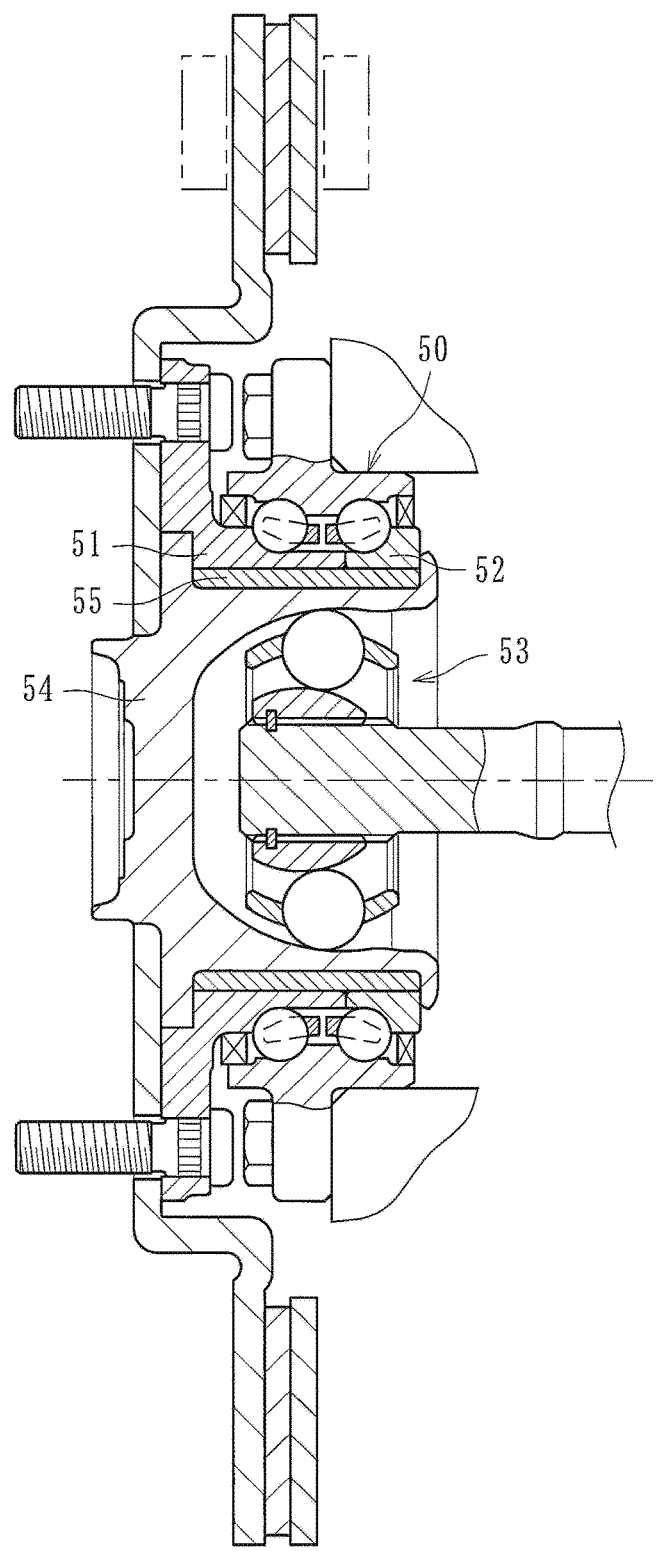

WHEEL BEARING APPARATUS

CROSS-REFERENCE TO RELATED APPLICATIONS

This application is a continuation of International Application No. PCT/JP2015/078737, filed Oct. 9, 2015, which claims priority to Japanese Application No. 2014-208888, filed Oct. 10, 2014. The disclosures of the above applications are incorporating herein by reference.

FIELD

The present disclosure relates generally to a wheel bearing apparatus that rotationally supports a wheel of a vehicle, such as an automobile and, more particularly, to a wheel bearing apparatus with a vibration damping member in a vibration transmitting path.

BACKGROUND

In order to improve riding comfort or reduce cabin noise, a structure has been proposed that provides vibration damping in a wheel bearing apparatus for mounting a tire wheel or brake disc. A structure, that includes a cylindrical vibration damping member, is arranged between a wheel hub, for mounting a wheel, and an inner ring. In one example shown in FIG. 9, an elastic member 55 is interposed between inner rings 51, 52 of a double row rolling bearing 50 and an outer joint member 54 of a constant velocity universal joint 53. It suppresses transmission of vibration to the double row rolling bearing 50 while damping the vibration of the constant velocity universal joint 53 by the elastic member 55. This improves the bearing life while suppressing the fretting wear of the bearing from the vibration. Such vibration damping members, i.e., elastic member 55, comprises polymer materials such as thermoplastic, elastomer etc. or a vibration damping steel plate with a polymer material sandwiched by normal steel plate (see e.g., JP2001-246903A).

However, a problem exists in that the vibration damping material of the polymer material, such as rubber of the prior art, even though it exhibits a high vibration absorbing effect relative to a high frequency range above several thousand Hz, it cannot exhibit a sufficient damping effect relative to resonation noise (road noise) of 200~300 Hz caused by vibration of a rubber tire running on an uneven road when secured to the wheel hub of the vehicle. Another problem of the prior art is that the vibration damping member lacks durability when high eccentric loads are repeatedly or long term applied onto the wheel hub. Thus, this tends to cause permanent strains by the eccentric loads.

SUMMARY

It is, therefore, an object of the present disclosure to provide a wheel bearing apparatus that performs both rigidity and noise and vibration suppression. The present wheel bearing apparatus keeps the rigidity of the wheel bearing apparatus and reduces the vibration transmitted to the cabin of a vehicle while suppressing road noise.

To achieve the object, a wheel bearing apparatus comprises an outer member integrally formed on its outer circumference with a body mounting flange. The flange is to be mounted on a knuckle forming part of a suspension apparatus. The outer member inner circumference includes double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The inner member outer circumference includes double row inner raceway surfaces that oppose the double row outer raceway surfaces. Double row rolling elements are rollably contained between the double row inner raceway surfaces and the double row outer raceway surfaces, respectively, of the inner member and the outer member. The outer member is adapted to be fastened to the knuckle through securing bolts. A vibration damping member is interposed between opposite surfaces of the body mounting flange of the outer member and the knuckle.

The wheel bearing apparatus of the present disclosure comprises an outer member integrally formed on its outer circumference with a body mounting flange. The flange is to be mounted on a knuckle forming part of a suspension apparatus. The outer member inner circumference includes double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The inner member outer circumference includes double row inner raceway surfaces that oppose the double row outer raceway surfaces. Double row rolling elements are contained between the double row inner raceway surfaces and the double row outer raceway surfaces, respectively, of the inner member and the outer member. The outer member is adapted to be fastened to the knuckle by securing bolts. A vibration damping member is interposed between opposite surfaces of the body mounting flange of the outer member and the knuckle. Thus, it is possible to provide a wheel bearing apparatus that performs both, keeping rigidity of the wheel bearing apparatus and reduction of the vibration transmitted to a cabin of a vehicle while suppressing road noise generated between a road surface and a wheel transmitted to the knuckle, via a bearing portion.

The present disclosure vibration damping member is formed of vibration damping alloy or vibration damping resin. This makes it possible to exhibit a vibration damping effect. Thus, this suppresses the transmission of road noise to the knuckle.

The present disclosure vibration damping member comprises a circular disc portion adapted to contact an inner-side side surface of the body mounting flange and a cylindrical portion axially extending from a radially inner end of the circular disc portion. Also, it is adapted to be inserted onto a cylindrical pilot portion of the outer member. Through apertures are formed in the circular disc portion through which the securing bolts are passed. This makes it possible to suppress the deformation amount of the vibration damping member while reducing the surface pressure applied to the vibration damping member. Thus, this improves the rigidity of the suspension of the vehicle.

The present disclosure cylindrical portion of the vibration damping member is press-fit onto the pilot portion of the outer member or into the knuckle. This simplifies the assembly of the wheel bearing apparatus onto the knuckle. Thus, this reduces the manufacturing cost.

The present disclosure has a brake drum or brake disc secured on the wheel mounting flange. A splash guard, for closing an opening of the brake drum or brake disc, is formed by the vibration damping member. This makes it possible to not only reduce vibration transmitted to a cabin while suppressing transmission of road noise to the knuckle but also perform the same assembling process or steps as current process or steps without changing the assembly line.

The present disclosure has female threads formed in the body mounting flange of the outer member to receive the securing bolts. The through apertures for the securing bolts are formed in the knuckle. Recesses, for receiving the vibration damping members, are formed around inner-side openings of the female threads or around outer-side openings of the through apertures of the knuckle. The axial thickness of the vibration damping members is larger than the depth of the recesses. This makes it possible not only to reduce vibration transmitted to a cabin while suppressing transmission of road noise to the knuckle but also to increase the close contact property of the vibration damping member to the body mounting flange and the knuckle. This is due to the fastening of the securing bolts to achieve a rigid fixation.

The present disclosure has through apertures formed in the body mounting flange and the knuckle. Vibration damping members are inserted into either one of these through apertures. Each of the vibration damping members comprises a cylindrical portion, inserted into the through apertures, and a flange portion. The flange portion extends radially outward from one end of the cylindrical portion. The flange portion is adapted to closely contact a side surface of the body mounting flange or the knuckle. Each of the cylindrical portions of the vibration damping member is formed with a female thread. The female thread receives a male thread of the securing bolt under a condition where the end face of the cylindrical portion abuts against the body mounting flange or the knuckle. This makes it possible to suppress transmission of road noise to the knuckle, via the securing bolts, and thus reduce vibration transmitted to a cabin.

According to the wheel bearing apparatus of the present disclosure, it comprises an outer member integrally formed, on its outer circumference, with a body mounting flange to be mounted on a knuckle forming part of a suspension apparatus. The outer member inner circumference includes double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The inner member outer circumference includes double row inner raceway surfaces that oppose the double row outer raceway surfaces. Double row rolling elements are contained between the double row inner raceway surfaces and the double row outer raceway surfaces, respectively, of the inner member and the outer member. The outer member is adapted to be fastened to the knuckle through securing bolts. A vibration damping member is interposed between opposite surfaces of the body mounting flange of the outer member and the knuckle. Thus, it is possible to provide a wheel bearing apparatus that keeps the rigidity of the wheel bearing apparatus and reduces of the vibration transmitted to a cabin of a vehicle while suppressing road noise generated between a road surface and a wheel being transmitted to the knuckle, via a bearing portion.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 1 is a longitudinal section view of one embodiment of a wheel bearing apparatus of the present disclosure.

FIG. 2 is a longitudinal section view of one modification of the vibration damping member of FIG. 1.

FIG. 3 is a partially enlarged view of another modification of the vibration damping member of FIG. 1.

FIG. 4 is a longitudinal section view of another modification of the vibration damping member of FIG. 1.

FIG. 5 is a partially enlarged view of another modification of the vibration damping member of FIG. 1.

FIG. 6 is a partially enlarged view of another modification of the vibration damping member of FIG. 1.

FIG. 7 is a partially enlarged view of another modification of the vibration damping member of FIG. 1.

FIG. 8 is a partially enlarged view of another modification of the vibration damping member of FIG. 1.

FIG. 9 is a longitudinal section view of a prior art wheel bearing apparatus.

DETAILED DESCRIPTION

A wheel bearing apparatus comprises an outer member integrally formed, on its outer circumference, with a body mounting flange to be mounted on a knuckle forming part of a suspension apparatus. The outer member inner circumference includes double row outer raceway surfaces. An inner member includes a wheel hub and at least one inner ring. The wheel hub is integrally formed, on its one end, with a wheel mounting flange. A cylindrical portion axially extends from the wheel mounting flange. The inner ring is press fit onto the cylindrical portion of the wheel hub. The inner member outer circumference includes double row inner raceway surfaces opposing the double row outer raceway surfaces. Double row rolling elements are contained between the double row inner raceway surfaces and the double row outer raceway surfaces, respectively, of the inner member and the outer member. The outer member is adapted to be fastened to the knuckle through securing bolts. A vibration damping member is interposed between opposite surfaces of the body mounting flange of the outer member and the knuckle. The vibration damping member comprises a circular disc portion and a cylindrical portion. The disc portion is adapted to contact an inner-side side surface of the body mounting flange. The cylindrical portion axially extends from a radially inner end of the circular disc portion. The cylindrical portion is adapted to insert onto a cylindrical pilot portion of the outer member. Through apertures are formed in the circular disc portion to enable passage of the securing bolts.

A preferred embodiment of the present disclosure will be described with reference to the accompanied drawings.

FIG. 1 is a longitudinal section view of one embodiment of a wheel bearing apparatus of the present disclosure. FIG. 2 is a partially enlarged view of one modification of the vibration damping member of FIG. 1. FIGS. 3~8 are partially enlarged views or longitudinal section views of other modifications of the vibration damping member of FIG. 1. In the description of this specification, an outer-side of a vehicle, when the wheel bearing apparatus is mounted on a vehicle, is referred to as "outer-side" (a left-side in FIG. 1) and an inner-side of the vehicle is referred to as "inner side" (a right-side in FIG. 1).

The wheel bearing apparatus shown in FIG. 1 is a so-called "third generation" type for a driven wheel. It comprises an inner member 3 with a wheel hub 1 and an inner ring 2. The inner ring is press-fit onto the wheel hub 1. An outer member 5 is inserted on the inner member 3 via double row rolling elements (balls) 4, 4.

The wheel hub 1 is integrally formed, on its outer-side end, with a wheel mounting flange 6 to mount a wheel (not shown) via a brake drum (or brake disc) B/D. The wheel hub outer circumference includes one (outer-side) inner raceway surface 1a. A cylindrical portion 1b axially extends from the raceway surface 1a. Hub bolts 6a are implanted at circumferentially equidistant positions on the wheel mounting flange 6.

The inner ring 2 outer circumference includes the other (inner-side) finer raceway surface 2a. The inner ring 2 is press-fit onto the cylindrical portion 1b of the wheel hub 1, via a predetermined interference. The inner ring 2 is axially secured on the wheel hub 1 by an applied predetermined bearing pre-pressure from a caulked portion 1c. The caulked portion 1c is formed by plastically deforming the end of the cylindrical portion 1b of the wheel hub 1 radially outward.

The wheel hub 1 is made of medium-high carbon steel such as S53C including carbon of 0.40-0.80%. It is hardened by high frequency induction hardening to have a surface hardness of 50-64 HRC over the inner raceway surface 1a and a region from an inner-side base 6b of the wheel mounting flange 6, which is a seal land portion of seal 9, to the cylindrical portion 1b. The caulked portion 1c is not hardened to keep hardness after forging. This enables not only to improve the wear resistance of the base 6b of the wheel mounting flange 6 but also to perform plastic machining of the caulked portion 1c without causing micro cracking thereon. This increases mechanical strength against the rotary bending applied to the wheel mounting flange 6. Also, it improves the anti-fretting strength of the cylindrical portion 1b where the inner ring 2 is press-fit.

The inner ring 2 is formed from high carbon chrome steel such as SUJ2. It is dip hardened to its core to have a hardness of 58~64 HRC. The rolling elements 4 are formed of high carbon chrome steel such as SUJ2. They are hardened to have a hardness of 62~67 HRC.

The outer member 5 is integrally formed, on its outer circumference, with body mounting flange 5b, adapted to be mounted on a knuckle 7. The outer member inner circumference includes double row outer raceway surfaces 5a, 5a opposing inner raceway surfaces 1a, 2a of inner part 3. The double row rolling elements 4, 4 are rollably contained between the inner and outer raceway surfaces 1a, 2a and 5a, 5a, via cages 8.

The outer member 5 is formed of medium-high carbon steel such as S53C including carbon of 0.40~0.80% by weight. The double row outer raceway surfaces 5a, 5a are hardened by high frequency induction hardening to have a surface hardness of 58~64 HRC. A seal 9 is mounted on the outer-side opening of an annular gap formed between the outer member 5 and inner member 3. A cap 10 is mounted on the inner-side opening to prevent leakage of lubricating grease sealed within the bearing and the entry of rain water or dust from the outside into the bearing.

Although it is shown here the wheel bearing apparatus is formed with a double row angular contact ball bearing using balls as rolling elements 4, the present disclosure is not limited to such a bearing and may be a double row conical roller bearing using conical rollers as the rolling elements 4. In addition, although it is shown here the wheel bearing apparatus is a third generation type where the inner raceway surface 1a is directly formed on the wheel hub 1, the present disclosure can be applied to a second generation type bearings (not shown) where a pair of inner rings are press-fit onto the cylindrical portion of the wheel hub.

A vibration damping member 11 of one embodiment of the present disclosure is interposed between opposite surfaces of the body mounting flange 5b of the outer member 5 and of the knuckle 7. The vibration damping member 11 is formed of vibration damping alloy. It has an L-shaped cross section with a circular disc portion 11a and a cylindrical portion 11b. The disc portion 11a is adapted to contact with an inner-side side surface 12 of the body mounting flange 5b. The cylindrical portion 11b is adapted to insert onto a cylindrical pilot portion 5c of the outer member 5. Through apertures 11c are formed in the circular disc portion 11a. The securing bolts 13 are inserted into the through apertures 11c.

Female threads 5d, for receiving, via screwing, the securing bolts 13, are formed in the body mounting flange 5b. The outer member 5 is fastened to the knuckle 7 by inserting the securing bolts 13 into the through apertures 7a formed on the knuckle 7, through apertures 11c of the vibration damping member 11, and screwing the securing bolts 13 into the female threads 5d of the body mounting flange 5b.

Examples of the vibration damping alloys forming the vibration damping member 11 are Mg (magnesium) alloy, ferrite system stainless alloy (e.g. JIS SUS 430 system etc.), Mn (manganese)-Cu (copper) alloy, Al (aluminum)-Zn (zinc) alloy, Co (cobalt)-Ni (nickel) alloy, shape memory alloy such as Ni—Ti (titanium) alloy, or vibration damping resin based on general plastic or general engineer plastic such as ABS (acrylonitrile-butadiene styrene), PA (polyamide) and POM (polyacetal). It is possible to suppress the transmission of road noise generated between a road and a wheel that are transmitted to the knuckle 7, via bearing portion, while keeping the rigidity of the wheel bearing apparatus by interposing the vibration damping members 11 between contacting surfaces of the body mounting flange 5b, of the outer member 5, and the knuckle 7. Thus, this provides a wheel bearing apparatus that reduces vibration transmitted into a cabin of a vehicle. In addition, the vibration damping member 11, having the L-shaped cross section, can suppress the deformation amount of the vibration damping member 11 by reducing the surface pressure applied to it. Thus, this increases the rigidity of the suspension of a vehicle.

The cylindrical portion 11b may be mounted on the pilot portion 5c of the outer member 5 or the knuckle 7. This makes it possible to simplify assembly and reduce the manufacturing cost.

FIG. 2 shows a vibration damping member 14 that is a modification of the vibration damping member 11 of FIG. 1. The same reference numerals are used in explanations of this modification as those used in the embodiment of FIG. 1.

The vibration damping member 14 of FIG. 2 is formed from vibration damping alloy and has a ring-shaped washer configuration. Each washer-shaped vibration damping member 14 is arranged around each securing bolt 13. The washer-shaped vibration damping member 14 performs not only to reduce vibration transmitted to a cabin of a vehicle while suppressing the road noise being transmitted to the knuckle but also firmly secures the wheel bearing apparatus by increasing the close contact property of the vibration damping member 14 to the contact surfaces of both the body mounting flange 5b and the knuckle 7.

The flat washer-shaped vibration damping members 14 are individually used on securing bolts 13 shown in FIG. 2. All the damping members 14 may be formed as a single plated vibration damping member 15 formed with a plurality of through apertures 11c for the securing bolts 13 circumferentially arranged along the periphery of the body mounting flange 5b of the outer member 5. This single plated-shaped vibration damping member 15 is able not only to reduce the number of parts but also to reduce the deformation amount of the vibration damping member 15. This increases the rigidity of a suspension of a vehicle while reducing the surface pressure applied to the vibration damping member 15. The vibration damping member 15 contacts against the surfaces of both the body mounting flange 5b and the knuckle 7 in a larger area than that of the flat washer-shaped vibration damping member 14.

FIG. 4 shows an example where a splash guard 16 is formed by a vibration damping member. That is, the splash guard is usually used to close an opening of the brake drum B/D mounted on the wheel mounting flange 6 of the wheel hub 1. Part of the splash guard is formed by a vibration damping member of vibration damping alloy. Accordingly, the splash guard, i.e. vibration damping member 16, is able to reduce vibration transmitted to a cabin of a vehicle while suppressing road noise being transmitted to the knuckle 7. Thus, as a practical matter, the performance of the same assembling steps as usual is carried out without changing the assembly line.

As shown in FIGS. 5 and 6, a vibration damping member 17 may be mounted on a body mounting flange 18 or a knuckle 19. As shown in FIG. 5, each vibration damping member 17 has a ring-shaped configuration formed from vibration damping alloy. The through aperture 11c for the securing bolt 13 is formed similarly to that of example in FIG. 2. The vibration damping members 17 are adapted to be mounted within recesses 20. Each recess 20 is formed around an inner-side opening of the female thread 5d on the inner-side surface 18a of the body mounting flange 18. The thickness of the vibration damping member 17 is formed larger than the depth of the recess 20. The body mounting flange 18 can be fastened to the knuckle 7 with the vibration damping member 17 contacting the side surface of the knuckle 7. This occurs by screwing the securing bolts 13 into the female threads 5d of the body mounting flange 18. Accordingly, it is possible to reduce vibration transmitted to a cabin of a vehicle while suppressing road noise transmitted to the knuckle 7 and firmly secure the wheel bearing apparatus to the knuckle 7 while increasing the close contact property of the vibration damping member 17 to both the body mounting flange 18 and the knuckle 7.

FIG. 6 shows another example similar to that shown in FIG. 5. This example is same as that of FIG. 5 except a recess 21, for containing the vibration damping member 17, is formed on a knuckle 19. Accordingly, the same effects can be also obtained by this example.

As shown in FIGS. 7 and 8, a vibration damping member 22 may be mounted on a body mounting flange 23 or a knuckle 24. As shown in FIG. 7, each vibration damping member 22 is formed of vibration damping alloy. Each comprises a cylindrical portion 22a and a flange portion 22b. The flange portion 22b extends radially outward from one end of the cylindrical portion 22a. The flange portion 22b is adapted to be closely contacted with an outer-side surface 23a of the body mounting flange 23 or the knuckle 24. Each cylindrical portion 22a of the vibration damping members 22 is formed with a female thread 26. A male thread 13a of the securing bolt 13 is screwed into the female thread 26 under a condition where the end face of the cylindrical portion 22a is abutted against the body mounting flange 23. Accordingly, it is possible to suppress road noise transmitted to the knuckle 7, via the securing bolt 13. Thus, this reduces vibration transmitted to a cabin of a vehicle.

FIG. 8 shows another example similar to that shown in FIG. 7. This example is the same as that of FIG. 7 except that a through aperture 27 for receiving the vibration damping member 22 is formed on a knuckle 24. Accordingly, the same effects can also be obtained by this example.

The wheel bearing apparatus of the present disclosure can be applied to wheel bearing apparatus with an outer member integrally formed with a body mounting flange and adapted to be mounted on a suspension of a vehicle.

The present disclosure has been described with reference to the preferred embodiments. Obviously, modifications and alternations will occur to those of ordinary skill in the art upon reading and understanding the preceding detailed description. It is intended that the present disclosure be construed to include all such alternations and modifications insofar as they come within the scope of the appended claims or their equivalents.

What is claimed is:

1. A wheel bearing apparatus comprising:
   an outer member with a body mounting flange integrally formed on its outer circumference, the body mounting flange to be mounted on a knuckle forming part of a suspension apparatus, the outer member inner circumference includes double row outer raceway surfaces;
   an inner member including a wheel hub and at least one inner ring, the wheel hub being integrally formed, on its one end, with a wheel mounting flange, a cylindrical portion axially extends from the wheel mounting flange, the inner ring is press fit onto the cylindrical portion of the wheel hub, the inner member outer circumference includes double row inner raceway surfaces that oppose the double row outer raceway surfaces;
   double row rolling elements are contained between the double row inner raceway surfaces and the double row outer raceway surfaces, respectively, of the inner member and the outer member;
   the outer member adapted to be fastened to the knuckle via securing bolts;
   a vibration damping member interposed between opposite surfaces of the body mounting flange of the outer member and of the knuckle; and
   through apertures formed in the body mounting flange or the knuckle, the vibration damping members are inserted into the through apertures, each vibration damping member comprises a cylindrical portion and a flange portion, the flange portion extends radially outward from one end of the cylindrical portion, the flange portion adapted to closely contact a side surface of the body mounting flange or the knuckle, each cylindrical portion of the vibration damping members is formed with a female thread that receives a male thread of the securing bolt under a condition where the end face of the cylindrical portion abuts against the body mounting flange or the knuckle.

2. The wheel bearing apparatus of claim 1, wherein the vibration damping member is formed of vibration damping alloy or vibration damping resin.

3. The wheel bearing apparatus of claim 1, wherein the vibration damping member flange portion is a circular disc portion, the circular disc portion adapted to contact with an inner-side side surface of the body mounting flange, the cylindrical portion axially extending from a radially inner end of the circular disc portion, the cylindrical portion adapted to be inserted onto a cylindrical pilot portion of the outer member, and through apertures are formed in the circular disc portion to enable passage of the securing bolts.

4. The wheel bearing apparatus of claim 3, wherein the cylindrical portion of the vibration damping member is press-fit onto the pilot portion or into the knuckle.

5. The wheel bearing apparatus of claim 1, wherein a brake drum or brake disc (B/D) is secured on the wheel mounting flange, a splash guard for closing an opening of the brake drum or brake disc (B/D) is formed by the vibration damping member.

6. The wheel bearing apparatus of claim 1, wherein female threads for receiving the securing bolts are formed in the body mounting flange of the outer member, through apertures for the securing bolts are formed in the knuckle, recesses for receiving the vibration damping members are formed around inner-side openings of the female threads or around outer-side openings of the through apertures of the knuckle, and the axial thickness of the vibration damping members is larger than the depth of the recesses.

* * * * *

UNITED STATES PATENT AND TRADEMARK OFFICE
CERTIFICATE OF CORRECTION

PATENT NO.        : 10,029,513 B2
APPLICATION NO.   : 15/482733
DATED             : July 24, 2018
INVENTOR(S)       : Hiroshi Kawamura et al.

Page 1 of 1

It is certified that error appears in the above-identified patent and that said Letters Patent is hereby corrected as shown below:

In the Specification

<u>Column 5</u>
Line 19    "finer" should be --inner--.
Line 27    "0.40-0.80%" should be --0.40~0.80%--.
Line 29    "50-64 HRC" should be --50~64 HRC--.

Signed and Sealed this
Second Day of October, 2018

Andrei Iancu
*Director of the United States Patent and Trademark Office*